United States Patent [19]

Kusner et al.

[11] 4,063,930
[45] Dec. 20, 1977

[54] PREPARATION OF WEATHERABLE FERRITE AGGLOMERATE

[75] Inventors: Robert Ernest Kusner, Brecksville; Robert William Muthig, Northfield, both of Ohio

[73] Assignee: Republic Steel Corporation, Cleveland, Ohio

[21] Appl. No.: 701,956

[22] Filed: July 1, 1976

Related U.S. Application Data

[63] Continuation of Ser. No. 526,268, Nov. 22, 1974, abandoned.

[51] Int. Cl.² ............... C22B 1/08; C21B 3/04; C22B 9/10
[52] U.S. Cl. ............................ 75/3; 75/25; 75/257
[58] Field of Search .................. 75/3, 25, 94

[56] References Cited

U.S. PATENT DOCUMENTS

| | | | |
|---|---|---|---|
| 3,519,386 | 7/1970 | Fedock | 75/94 |
| 3,645,719 | 2/1972 | Minnick | 75/94 |
| 3,669,618 | 6/1972 | Cappel | 75/94 |
| 3,721,548 | 3/1973 | Hodge | 75/94 |

FOREIGN PATENT DOCUMENTS

698,147  11/1964  Canada .................... 75/25

Primary Examiner—P. D. Rosenberg
Attorney, Agent, or Firm—Cooper, Dunham, Clark, Griffin & Moran

[57] ABSTRACT

A weatherable ferrite agglomerate is prepared by establishing compacted or other coherent bodies consisting of a mixture of fine particles of lime and of iron oxide, and heating the bodies, in a reducing atmosphere, at a suitable temperature up to about 2100° F; under these circumstances, the lime and iron oxide react to form dicalcium ferrite, yeilding agglomerate bodies that are useful for furnace feed, as for a blast furnace. The iron oxide may conveniently consist of one or more waste oxides from iron and steel making operations, and the lime can be supplied as limestone, with a preliminary heating of the mixture, before or after forming the coherent bodies, to calcine the stone to lime. The agglomerate is advantageous in providing a way of using waste iron values and of supplying lime as such, for furnace operations, with practicality because of the weatherability which ordinary (calcined) lime does not have, while avoiding difficulties of making sintered bodies or the like.

20 Claims, 2 Drawing Figures

PREPARATION OF WEATHERABLE FERRITE AGGLOMERATE

This is a continuation of application Ser. No. 526,268 filed Nov. 22, 1974, now abandoned.

BACKGROUND OF THE INVENTION

This invention relates to agglomerates of iron oxide and lime which can be prepared in a form suitable to be fed into mixtures or melts for making iron and steel, and particularly, for example, as part of the feed for a blast furnace. In a special sense, the invention is concerned with making composites containing lime and iron values: (a) by utilizing material such as waste iron oxides that because of their finely divided state are not appropriate for direct supply to furnace operations; while (b) providing an effective and economical way of introducing lime that has already been calcined into such operations, where it is needed. Although the invention is concerned with iron oxides of any origin, including iron ore, the present improvements are particularly advantageous for use of iron oxide materials that might be deemed waste, as for example iron oxide fume or dust removed from the discharged gases of steel-making operation, and likewise scale or similar oxide developed from rolling, heat treating, or other steelmaking or processing steps.

It is manifestly desirable to recycle various iron oxides of the described character, for instance so as to use them in the primary process of making iron in a blast furnace. For such purpose, it is also desirable to get the waste oxides into useful physical shape, as in pellets or briquettes, for instance as has been done in the case of certain iron ores after magnetic or other concentration. It has also been recognized that iron oxide materials of this sort can be included along with iron ore in procedures for effecting combination of such ore with limestone to develop sintered, i.e. fused or partly fused products whereby both lime and iron values are combined in strong, durable pieces of agglomerate that can be used for furnace feed. The operation of making such sintered products is effective and the products themselves are useful for the intended purpose, but the sintering operation usually requires a relatively high temperature, e.g. to and above 2600° F, and may involve environmental problems, e.g. resulting from the requisites as to nature of fuel and manner of combustion, with corresponding expense for correction of such problems.

In the sintered products just described, the limestone is converted to lime during the heating of the materials, and the lime is found to react with iron oxides (usually $Fe_2O_3$ or $Fe_3O_4$) at the sintering temperatures (2600° and upwards) to yield dicalcium ferrite, a product from which the lime and iron oxide are readily released when the material is employed in a furnace.

A useful process for recovering iron oxide dust from furnace fume or similar gaseous sources has involved treating lumps of lime (e.g. as calcined in a preliminary step of the operation) to a flow of such iron oxide dust in furnace gas or the like. The temperature of the gas and thus of contact between the dust and the lime bodies is maintained in a range upwards of 2150° F and the surrounding atmosphere (i.e. the gas) is caused to have a reducing nature such that the iron oxide is presented in the form of FeO, so-called wustite. Under such circumstances it is found, for example in a range of temperatures up to about 2600° F, that the iron oxide is adsorbed into the surface layers of the lime lumps, where it reacts to form dicalcium ferrite, the remaining portion of the lime being unaffected and thus constituting a lime core of considerable size in each piece. In such process, where iron oxide particles were carried by the furnace gases to the lime lumps, the temperature of reaction was found quite critical, in that essentially no adsorption and corresponding chemical combination of the iron values into the lime occurred until temperatures substantially above 2100° F, i.e. approaching 2200° F, were reached.

In the light of the foregoing review of the prior art, it may be pointed out that the provision of waste iron oxides in the form of some kind of agglomerate is a desirable objective, and that another and eminently significant objective is to provide an economical and effective way of presenting lime, i.e. having the state of calcium oxide as distinguished from limestone, in a form that is practical, for the standpoint of storage and handling, for u se in blast furnaces. As will be explained below, there is an advantage in supplying lime to such furnaces in calcined or equivalent form, but lumps or other bodies of simple calcined lime, of size required for furnace feed, are not practical, because when stored in weather or ordinary air conditions, the material hydrates, and the pieces break up and deteriorate.

SUMMARY OF THE INVENTION

With the above objectives in mind, it has now been discovered that an extremely useful product containing lime and iron values, in the form of pieces, e.g. fragments of strip, lumps, briquettes, large pellets, or the like, may be achieved by a procedure which involves mixtures of the ingredient materials in finely divided form, appropriately compacted and treated by one or more heating stages. If the lime values have been supplied as pulverized limestone, a preliminary part of the heating serves to calcine the stone to lime. A chief aspect of the discovery is that by special heating of such mixed materials, to no more than a moderately high temperature and under certain controlled conditions, a mineralizing reaction occurs between the iron values and the calcium oxide. This reaction puts the lime into a state whereby the product pieces are fully weatherable as well as strongly coherent, and thus become a very useful composition containing both lime and iron values.

In its essence, the process involves first establishing a coherent mixture of finely divided lime and finely divided iron oxide. The body or bodies of such mixture, preferably compacted at a moderately high temperature up to about 1800° F, or otherwise cohered, are subjected to heating in a reducing environment (as by having a minor proportion of coke present to produce carbon monoxide) and in a temperature range of preferably about 1700° F to about 2000° F, with the result that the iron values are converted to ferrous state, e.g. FeO, or at least the iron oxide material can be considered to have a significant ferrous content, and such values or material are caused to react with the lime to produce a mineralized complex, understood to be dicalcium ferrite.

That is to say, when the intimately mixed fine particles of lime and iron oxide (such as $Fe_2O_3$ or $Fe_3O_4$, or both) are suitably heated under reducing conditions whereby the iron is transformed into the form of FeO, the iron values and the lime react effectively to yield dicalcium ferrite. The reaction, which can go essentially to completion, is considered to be as follows:

$$2FeO + 2\,CaO + CO_2 \rightarrow 2CaO\cdot Fe_2O_3 + CO$$

A particularly significant finding is that because of the intimately mixed, finely divided nature of the lime and iron oxide particles, this reaction occurs at relatively low temperatures such as from about 1650° F to about 2100° F, indeed preferably below 2000° F. Whereas the higher iron oxides, such as hematite and magnetite, react directly with lime at temperatures of 2600° F and above, e.g. to produce dicalcium ferrite in the sinter product mentioned above, such reaction does not appear to occur, at least not completely or solely, at substantially lower temperatures, although it may in effect occur (in the present process) when a considerable part of the iron oxide is transformed to FeO and reacts as such. Likewise, in the treatment of lime lumps with iron oxide fume in furnace gas (without actual mixture of lime and iron oxide particles), it was found that effective reaction of FeO with lime did not occur until temperatures in the range above 2150° F were reached. In the latter procedure, the iron oxide particles were deposited on the exterior of solid lime pieces and apparently penetrated the pieces by forming some preliminary combination of a liquid character, with some of the lime.

As stated, it is now found that with the iron oxide and lime particles premixed, in very finely divided condition, a mineralizing (ferrite-forming) reaction occurs at an unexpectedly lower temperature range. Apparently there is fast interpenetration between the lime and iron oxide material, presumably by molecules of one into particles of the other, and reaction is completed relatively rapidly, for example in heating times of the order of 1 hour. Assuming sufficient iron oxide values present to take care of all the lime under the above equation, the lime is found to react substantially completely.

As a part of the procedure, the lime values may be originally included in the form of limestone, e.g. crushed and ground to fine particle size, an initial state of the heating of the mixture being effective to calcine the limestone to the form of calcium oxide, i.e. lime. Thus in a practical sense, the process can utilize highly available materials such as limestone (whether ordinary, or dolomitic or of other magnesium-containing character), and iron oxides such as mill scale, furnace dust or fume, or other iron oxide recovered from various wet or dry scrubbing operations or the like. These particles, whether originally in fine form or further comminuted, are mixed and formed into compacted or other coherent bodies or pieces of a body, and the heat treatment may be used first as an aid in compacting and for calcining the stone, and includes the final and critical step of heating in the presence of reducing conditions to effectuate the described mineralization.

In summary, the new process advantageously involves mixing fine limestone (or lime) particles and fine particles of iron oxide, and either preliminarily heating the mixture and hot compacting it or in some other way converting the mixture to such coherent agglomerate, as by pelletizing. The limestone is calcined to lime either in the preliminary heating or in a preliminary phase of subsequent heating of the agglomerate, so that in one way or another there are established bodies consisting of a coherent mixture of lime and iron oxide particles. The method continues through the mineralizing step which involves heating the coherent lime and iron oxide mixture to a temperature of 1650° F to 2100° F or thereabouts, as for example 1800° F, while maintaining reducing circumstances. The iron oxide (substantially as FeO) and lime then react to produce dicalcium ferrite, as by the equation given above. The reducing circumstances are conveniently attainable by inclusion of fine particles of coke, such as coke breeze, along with the pieces of agglomerate in the mineralizing step, i.e. a small amount of carbon, insufficient to reduce the oxide to metallic iron. Carbon can alternatively be provided along with iron oxide values which are contained in fume that also contains unburned carbon particles, or carbon may be present if a carbonaceous binder is used in making pellets of the mixture to be mineralized.

The novel product of the mineralizing stage, conveniently in pieces or lumps of a size appropriate for handling and for feed to a blast furnace, or other desired furnace utilization, being at least big enough to be retained on a screen having ¼ inch openings and advnatageously in the range of up to one or two inches (in one or more dimensions), comprises these strong, fully weatherable though non-sintered pieces, constituting lime and iron oxides values in a new form highly suitable for blast furnace or like use. With the lime mineralized into a metamorphic bond with the iron values, it is found to resist the hydration and corresponding crumbling or degradation that occurs on exposing lumps of ordinary calcined lime to open weather and that prevents the use of such lime as a convenient raw material to be stored and supplied to a blast furnace, powdered materials being very unsuitable for such feed. At the same time, the waste iron oxide values are effectively presented in useful form in these pieces, briquettes or pellets; the mineralized bond with the lime serves a secondary function in strengthening the pieces of agglomerate, considered as coherent bodies of the iron oxide materials.

In a number of ways, it is advantageous to supply at least some of the limestone requirement of a blast furnace in precalcined form, i.e. so that it has full chemical reactivity as calcium oxide from the beginning of its descent with the material of the stock or charge. To the extent that heat is not needed to calcine stone in the furnace, coke is not required as fuel solely for such purpose; moreover the space inside the furnace chamber is then more efficiently occupied by materials of the burden (coke, iron oxide, lime) as consumed more directly in making and purifying iron.

The present invention represents an efficient and relatively inexpensive procedure and an improved product, involving materials that are highly useful in charges for iron or steel furnaces that require lime, e.g. by way of providing some of such lime values and by way of economically utilizing iron oxide wastes that heretofore have been recovered by less advantageous or more costly sintering operations. Further aspects of the invention are disclosed in the more detailed description below.

DETAILED DESCRIPTION

As indicated, the invention is applicable to a variety of iron oxide materials, notably iron-containing dusts, sludges, scale and other waste developed in operations for making iron and steel, and iron and steel products. These wastes usually consist of iron oxide plus small percentages of other materials such as silica, alumina, lime, magnesia, manganese oxide, and in some instances (such as blast furnace dust and sludge) a significant proportion of carbon, e.g. up to about 15%. In general, the iron content of the waste materials, measured as iron though actually almost all in the form of oxide, runs from about 40 to about 65% by weight, the iron oxide being very predominantly hematite ($Fe_2O_3$) or magnetite ($Fe_3O_4$) or often a mixture of them. Common suources of these materials are roll scale and various dusts or sludges removed by wet or dry processes from the off gases of furnaces such as the basic oxygen and open hearth furnaces used in making steel, and iron-producing blast furnaces. These waste materials may come, of course, from any of a variety of types of scrubbing, collecting or other recovery equipment.

While the present process is useful with material consisting partly or even solely of new, suitably beneficiated iron ore, it appears unusually convenient to utilize mixtures of iron oxide wastes of various types and sources, including a significant proportion of roll scale. Since a variety of these materials is commonly generated in an integrated steel mill, indeed more or less continually, the process is of special advantage in its adaptability to handle mixtures of such products, in various proportions, for making the new agglomerates.

Figure 1:
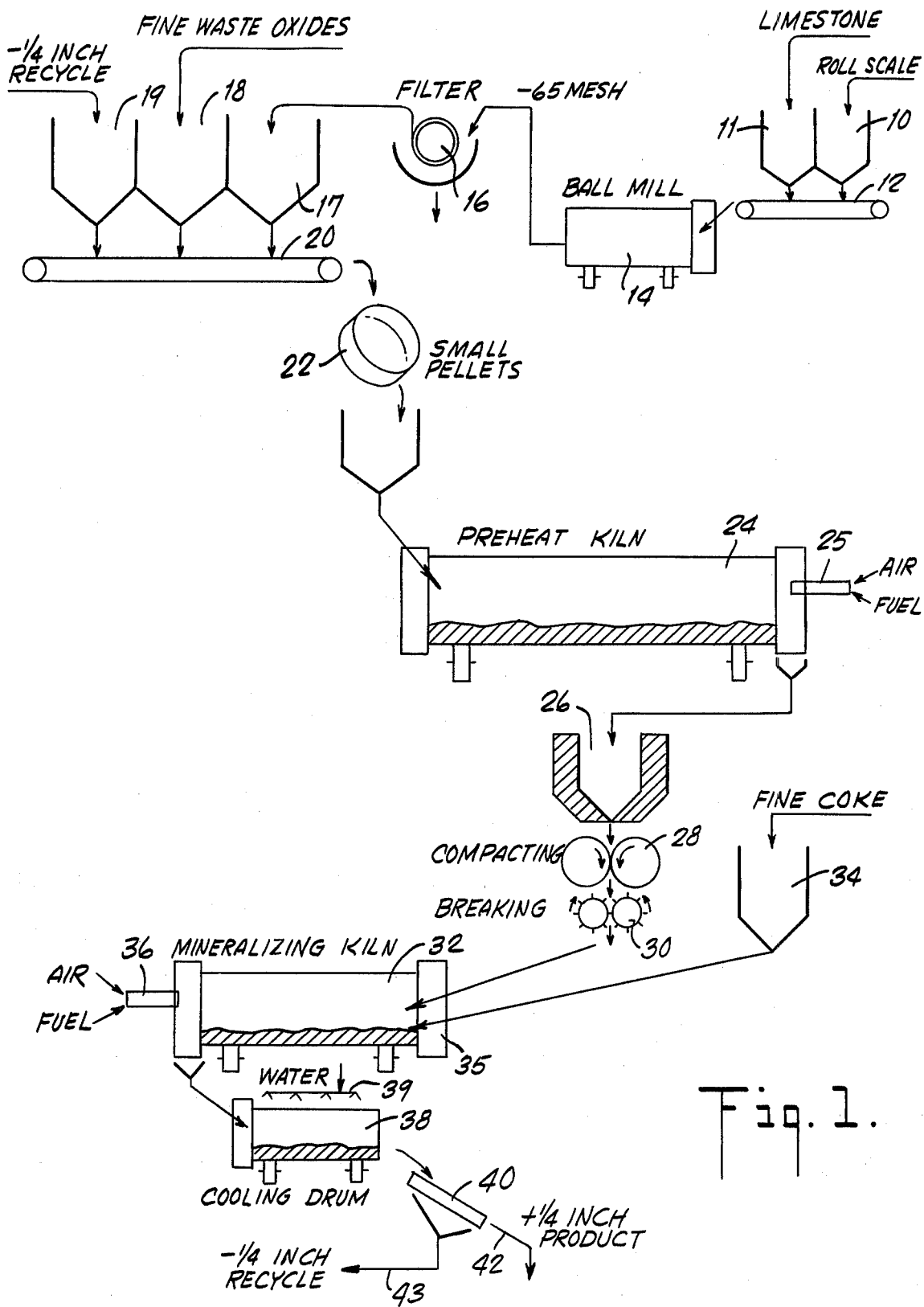
FIG. 1 is a diagrammatic flow layout of a sequence of apparatus, for carrying out the method with a feed of limestone and various iron oxides, by first hot compacting the ingredients and then mineralizing.

One example of the process may be described in relation to FIG. 1, where appropriate quantities of roll scale (e.g. debris from hot rolling operations) and limestone are supplied as by hoppers respectively designated 10 and 11, to a conveyor belt 12 which carries the materials to a ball mill 14 where they are wet ground to a suitably small particle size, e.g. −65 (minus 65)mesh, meaning that the particles will all pass a standard screen of 65 openings to the linear inch (Tyler scale). The slurry or pulp from the mill 14 is transferred to a rotary drum filter 16, where the water is substantially removed from it and the ground mixture of limestone and roll scale are supplied to a further hopper 17. Another type or types of waste iron oxide material, which is already in very fine particle size, such as various dusts and the like, is conveniently supplied to another hopper 18, while a third hopper 20 may be fed with recylced undersize material, i.e. a fine fraction removed from the product as explained below, for example $-\frac{1}{4}$ inch material, which has already been processed by mineralization.

The materials supplied through the hoppers 17, 18 and 19 are appropriately collected, e.g. on a conveyer belt 20, and are subjected to preheating and mixing operation in an appropriate kiln. Preferably (but not necessarily) the fine powdered materials are preliminarily pelletized into very small grains as by passing across a shallow pan-type pelletizer 22, the effect being to yield micro-pellets which avoid the tendency of extremely fine particles to clog a kiln by ringing or similar effects. Thus, mostly in the form of fine pellets or granules, which do not have to be particularly strong, the material is supplied to the preheat kiln 24, which is a suitably sloping rotary kiln, with countercurrent firing at the discharge end using suitable fuel through a burner 25.

In the kiln 24, the various oxides and limestone, all as small particles, are further mixed together and heated to a suitable temperature, as in the range of 1500° to 2000° F conveniently about 1800° F. The limestone is advantageously calcined to lime (CaO) during passage through the kiln. The materials (with the stone converted to lime) are then continuously discharged into the hopper 26 of a roll compaction mill 28 consisting of opposed, driven rollers, where such material, continuously received as a hot mass between the rollers, is subjected to compacting pressure so as to deliver a continuous strip or strand of compact, having a thickness determined by the diameter and the function angle of the rolls 28, as for example about $\frac{1}{8}$ to $\frac{3}{8}$ inch. Specifically, the highly heated state of the mixture, the fineness of particle size (of material from the belt 20), and the pressure between the compacting rolls yields a remarkably strong strip of material. As a specific example, a batch preheating kiln 24 having an internal diameter of 20 inches and a length of about 2 feet, was employed in suitable pilot-type operations, delivering the mixture at 1800° F to a mill 28 which consisted of a pair of 24-inch diameter rolis having a $4\frac{1}{2}$ inch width and thereby delivering a continuous hot-compacted strip about 4 inches wide.

The compacted strip is broken up into pieces of useful size, by a breaker 30 consisting of a pair of rolls with suitable blades, pins or studs, and the compacted material is then delivered into a mineralizing kiln 32 as pieces consisting of fragments of the $\frac{1}{4}$-inch strip having lateral dimensions in the range upwards of $\frac{1}{4}$ inch to 1 inch or 2 inches or more. A minor porportion of carbon, in the form of coke breeze (i.e. fine particles) or flue dust is supplied via a hopper 34 to the inlet end 35 of the kiln 32, along with the broken compact pieces of lime-iron oxide particles. In general, the carbon supplied via hopper 34 was about 3% of the weight of the mixed materials.

The kiln 32, which can be somewhat smaller than the kiln 24 but is similarly fired with an appropriate burner 36 at the discharge end, is also a sloping rotary kiln, where the supplied materials can be heated and/or maintained at suitable temperature during their time of passage, say a period of the order of one hour. As will be understood, kilns 24 and 32 can be fired with any suitable fuel such as natural gas, oil, pulverized coal, or other combustible material supplied to the burner in a mixture with a regulated amount of air for combustion, the flame and hot gas travelling countercurrently to the solid material going down the slope of each kiln. During passage through the kiln 32, where the pieces of mixed materials are heated to and/or maintained at the stated temperature of about 1800° F, the mineralizing reaction between the iron values (in the form of FeO) and the lime occurs, yielding dicalcium ferrite ($2CaO \cdot Fe_2O_3$).

As explained, by reason of controlled reaction of the coke or other carbon supplied through the hopper 34 to the mineralizing kiln, and mixed in with the pieces of compact, or otherwise furnished in the charge, or by reason of other suitable technique of gas supply, a reducing atmosphere (e.g. of 50% carbon monoxide and 50% carbon dioxide by volume) is maintained in the kiln, so as to convert or establish the iron oxide material essentially in the form of ferrous oxide (FeO), sometimes called wustite, or at least to get the iron oxide partially into such form or its equivalent. Only a relatively small proportion of carbon, e.g. 2 to 10%, is needed for this condition, and the exact amount does not seem to be very critical, although it is usually important to avoid highly reducing conditions (as with a large amount of coke) because it is not desired to reduce a significant amount of the iron oxide all the way to elemental iron, which, under reducing conditions, does not undergo any mineralizing reaction with lime.

As also explained, the effect of the reaction or reactions in kiln 32 is to convert the lime to dicalcium ferrite, such conversion being understood to occur, at least in result, by the mineralization reaction identified above.

Referring further to FIG. 1, the hot product from the mineralizing kiln 32 is conveniently passed through a cooling drum, e.g. a substantially horizontal, slightly sloping, rotating drum 38, which can be cooled by external water sprays 39, and which delivers the cooled product pieces onto a screen 40, suitably rotated or agitated. The material which does not pass the screen, for example $+\frac{1}{4}$ inch, is delivered at 42 to constitute the desired product, while the finer material goes into a recycling stream 43 to be fed, as previously explained, into the hopper 19. As will be understood, the process may be essentially continuous through the train of equipment shown in FIG. 1, and various elements are continuously rotated, including the mill 14, filter 16, kilns 24 and 32, and the drum 38.

As an example of useful practice of the process, a mixed composition of various oxides and limestone was supplied to the preheat kiln. One such mixture included approximately: 9.5% BF (blast furnace) dust, 9.0% BF sludge, 4.5% OH (open hearth) dust, 8.0% BOF (basic oxygen furnace) dust, 19.0% roll scale, and 50.0% limestone. All percentages here and elsewhere are stated by weight unless otherwise designated. In this mixture, substantially all of the particles, including particularly the roll scale which usually originates as coarse material, were $-28$ mesh or much finer, the limestone having been ground to $-65$ mesh and the roll scale likewise. In this instance, the material was fully mixed and preheated, as in the kiln 24, to a temperature of about 1800° F, the passage time being essentially such as will raise the temperature to that value and as will also calcine the limestone of CaO, for example about 2 hours.

The discharged, substantially homogeneous mixture at the temperature of 1800° F was then compacted by the mill 28 to a strand about $\frac{1}{4}$ inch thick and 4 inches wide, which was broken up into pieces of, say, 3 inches dimension or smaller and supplied to the mineralizing kiln 32, where the treatment lasted about 1 hour at 1800° F. About 3% of coke breeze was supplied in admixture with the incoming pieces of compact, and it was found that under firing conditions to reach and maintain the stated temperature, a suitable reducing environment was achieved. Thus, whereas the iron values in the various components (dust, sludge and scale) were essentially all in the form of $Fe_2O_3$ (hematite) or $Fe_3O_4$ (magnetite), such values were converted, in the kiln, to the ferrous state (i.e. FeO) so that the above-described reaction occurred.

The resulting, cooled pieces of compacted and mineralized agglomerate were found very suitable for use in blast furnaces or the like and in particular were demonstrated to be readily reducible, in similar fashion to conventional iron ore, such as taconite pellets. Most importantly, the product pieces were not only demonstrated to have good strength by tumbling and rupture tests, but demonstrated remarkably good resistance to air and weather, i.e. under a weatherability test which involves exposing the agglomerate to an air atmosphere saturated with water at 200° F for a period of 16 hours followed by examination of the material to determine the extent of mechanical disintegration caused by lime hydration as measured by screening on 6 mesh screening. The product of the above example was 100% +6 mesh, i.e. no disintegration finer than such screen size. This is believed to be fully satisfactory for handling and storage of a lime-continuing agglomerate, indicating its practicality.

Comparative tests have indicated that effectiveness of the process, particularly in developing a weatherable product, was related to the fineness of the materials, and indeed the speed and completeness of mineralizing reaction appeared to increase with smaller particles, and the rapidity of reaction also generally increases with temperature in the noted range. In particular, when two similar compositions of dusts, sludge and roll scale (as in other examples) were mixed with $-65$ mesh limestone, but where the roll scale had only been ground to $-14$ mesh, the weatherability of the mineralized product was considerably lower. That is to say where the roll scale again represented respectively 19 and 23% of the total mix and the limestone respectively 50 and 38%, but the roll scale, being the largest component, was only ground to $-14$ mesh and thus presented a relatively substantial quantity of $+28$ mesh material, the ultimate mineralized pieces showed a lower weatherability in that only about 75%, after weathering, remained on 6 mesh. Moreover, whereas in the previous example the pieces showed a modulus of rupture of 4070 psi, the value for the products last described was only about 1550 Psi.

In a future example of substantially the same composition as to iron oxide materials, except that the roll scale was crushed only to $\frac{1}{4}$ inch and in fact included a significant proportion of pieces above 14 mesh or even $+10$ mesh, and except that the amount of likestone was only 33% of the total mix, good weatherability of the ultimate product, i.e. 100% +6 mesh, was obtained, with a modulus of rupture of 1706 psi. In this case with less lime to be mineralized, there was presumably a relatively sufficient amount of iron oxide material in fine particle size to serve the purpose, but if larger proportions of limestone are to be mineralized, as in the 50% limestone mix where the roll scale was $-14$ mesh, lime mineralization is not complete and weatherability is poor. Indeed, in the above products showing 75% weatherability values, the free lime content was 12.8% and 3.6% respectively. In contrast, the good weatherability products showed free lime of not more than about 2%.

In general, a preferred agglomerate is represented by a score of at least 90% ++6 mesh on the weatherability test, and 65% or more at $+\frac{1}{4}$ inch remaining after an ASTM tumble test. In general, it appears that not more than about 2% free calcium oxide should remain in the product after mineralization. In other words, the amount of iron oxide relative to the lime should be sufficient to mineralize substantially all of the lime values, specifically be the reaction of the iron values in ferrous state, to yield dicalcium ferrite.

While there is no absolute minimum of lime that is required — indeed in the sense that fairly strong, hot-compacted, waste iron oxide products can be made without lime at all — it is apparent that efficient use of the mineralizing step presupposes the inclusion of a useful amount of lime, as for example an amount represented by limestone of at least 20% of the starting mixture. Preferably, the limestone content runs up to about 50%, as in the above examples, it being recalled that dicaacium ferrite contains 41% by weight Fe and 42% by weight CaO.

In one sense, minimum for the limestone content is enough to produce what may be defined as self-fluxing strip, i.e. wherein the ratio of bases to acids is approximately 1.0. That is to say, the waste iron materials necessarily contain some acidic materials (alumina, silica, and others as will be known) and the lime should be at least enough so that these materials are fluxed by the lime. Ordinarily, for best practical utility the limestone can be in substantial excess of the self-fluxing requirement, thus affording a convenient mode of providing lime in precalcined form; the limestone should not, however, be more than can be mineralized by the iron oxide present.

Various mixtures of waste iron oxides, dust, sludge products, scale materials and the like may be employed, and the process seems well adapted to any and all of these materials, including iron ore itself if desired. As explained, it is important that there be at least sufficient iron oxide material of fine particle size, e.g. $-28$ mesh or preferably $-35$ mesh and indeed advantageously $-65$ mesh or thereabouts, to react with the lime. Almost invariably, of course, any selected grade of size includes many very fine particles as well as those just passing the stated screen.

In general, many of the waste iron oxides generated in the iron and steel industry are finely divided, sufficiently for the present purpose, e.g. the dusts and sludges recovered from various furnaces. Although conveniently the lime content of the mix for the agglomerate is provided by limestone ground at least to the fineness of the iron oxides, preferably $-65$ mesh, other sources such as burnt lime fines (from certain processes) can be used. Mill scale, i.e. roll scale, may ordinarily contain many large pieces well upwards of $\frac{1}{4}$ inch in size, and indeed often the major part may be at least $+14$ mesh; hence this material is ground to a desired fineness, e.g. $-65$ mesh. While roll scale is commonly derived from hot rolling operations, similar scale such as scarfing scale is useful and can be considered to come within the designation of roll scale.

For effectiveness of the procedure, with desired mineralization of the lime, the lime should be in fine particles, e.g. all $-20$ mesh, advantageously substantially all $-28$ mesh (better, $-35$), preferably at least about 50% finer than 65 mesh, and very preferably all $-65$. It also appears that at least the portion of iron oxide (which may be all of it) that is to react with the lime, should also be in fine particles, e.g. within the same grades and subject to the same preferences as have been stated for lime.

Figure 2:
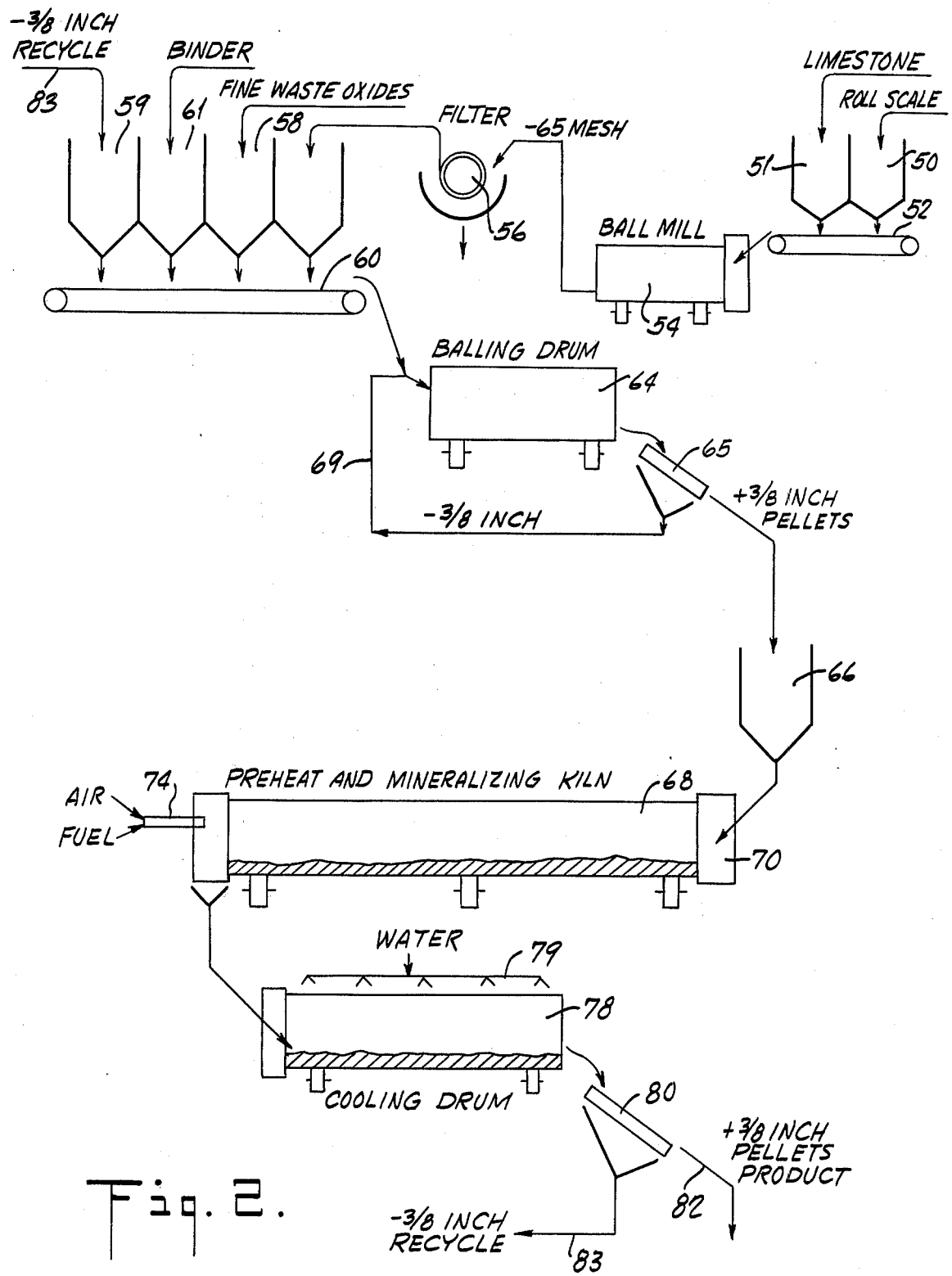
FIG. 2 is a like diagrammatic layout of apparatus, illustrating another form of the procedure, wherein the ingredients are pelletized to a desired form and size and then subjected to preheating and mineralization.

Another example of the procedure, wherein the materials are pelletized by a balling operation rather than hot compacted, is shown in FIG. 2. Here the limestone and roll scale as respectively supplied to the hoppers 50 and 51 are carried by the conveyor 52 to the wet grinding operation in the ball mill 54, and the water is substantially removed from the resulting $-65$ mesh mixture by the filter 56. This mixture of scale and limestone is supplied to a hopper 57, and other waste oxides (as before) may be introduced through a hopper 58. Recycled undersized product material, for example in this instance $-\frac{3}{8}$ inch diameter, can be fed back at hopper 59 and all of this is collected, in desired proportionate amounts, by a belt 60 which may also receive a small amount (e.g. 1 $-2\%$) of binder material (e.g. bentonite) from a hopper or vessel 61, i.e. in order to promote the pelletizing operation.

The mixed ingredients from the belt 60 are fed continuously into a balling drum 64, i.e. a cylinder rotating on its horizontal or slightly sloping axis. Here by aid of the binder, the rolling action of the drum causes the fine material to ball up as pellets, for example up to $\frac{1}{2}$ inch in diameter. Accordingly, the drum discharge such pellets, e.g. as are screened to exceed $\frac{3}{8}$ inch diameter, by the screen 65, so that they are fed through the hopper 66 to a relatively long rotary kiln 68 where the balls or pellets are preheated and subjected to mineralizing reaction. Any undersized material from the screen 65 can simply be fed back into the balling drum 64, as indicated by the return path 69 for such material.

In the kiln 68, which rotates on its substantially horizontal axis but has the necessary small slope from its input end 70 to its output end 72, the feed of pellets is advanced down along a kiln, by a continuously driven rotation, while heat is supplied as by a burner 74 at the discharge end countercurrent to the passage of the charge. Again, such heat may be provided by combustion of natural gas, oil, pulverized coal or other combustible material. In the early stages of the heating operation in the kiln 68, the limestone is rapidly calcined to lime, and in the remaining path of the kiln, toward the exit 72, the desired mineralization occurs. To the extent necessary, carbon is included in the feed to the kiln, as in the form of a few percent of coke breeze, but if part of the feed is blast furnace waste (dust or sludge) containing, say, 10 to 15% carbon, it may, especially in the case of pellets, provide part or all of the carbon necessary for a reducing condition in the kiln. Although not wholly unreactible, such carbon appears less desirable for treating compacted or briquetted pieces; in any case, the requirement is to have reactible carbon in the kiln charge, in the small proportion explained above.

The main high temperature procedure in the kiln 68 is similar to that of the kiln 32 in FIG. 1, and the heated pellets are discharged through a rotary horizontal cooling drum 78 cooled by external water sprays 79. The cooled material delivered over the screen 80 in the form of ultimate mineralized pellets having a size of $+\frac{3}{8}$ inch as indicated at 82, represents the desired product. As explained, material finer than that passing across the screen 80 falls through the latter and is recycled at 83, e.g. returning to the hopper 59 for supply to the original mixture.

The operations in FIG. 2 are essentially the same as in FIG. 1, except that all of the heating is accomplished in a single, long kiln or equivalent chamber, and the formation of the coherent and compacted bodies is achieved by pelletization. The temperatures, proportions of materials, and times of treatment, e.g. for accomplishing the reactions in the kiln 68, are conveniently the same as required for the operation of FIG. 1. The final pellets can be expected to have good weatherability and afford recovery of waste iron oxides while also providing lime in a usefully reactive form, and are suitable as feed for a blast or other furnace in the making of iron or steel.

Other modes of compacting and shaping the bodies of intimately mixed materials are conceived to be useful. For example, in the apparatus of FIG. 1, the compacting rolls 28 may be substituted by briquetting rolls, which are essentially a pair of rolls with opposed mating cavities where the falling material is compacted into briquette shaped by such cavities and discharged after it has traveled the rolls. There is then no need for the breaker 30. Although the briquetting operation yields uniform sized pieces, the somewhat faster and easily controlled roll-compacting process affords a product of excellent utility and is presently preferred.

A chief criterion for suitability of waste iron oxide materials in the present process is fineness of particle size, such as the examples of size ranges indicated above. In general, it presently appears that particles larger than 20 mesh are not very effective, while those smaller than 65 mesh, indeed preferably much finer, can be expected to be highly suitable. The same limits are believed to apply to the limestone (or lime) ingredient. Much waste material is already fine enough: for instance the BP sludge used above was all −28 mesh, about 85% −65 and about 55% −325; BP dust was essentially all −20, only about 14% +35, over 50% −65 and 30% −100; and BOP and OH dusts appeared to the extremely fine, e.g. particles of the order of 1 micron diameter or less. Ballmilling the larger-sized materials such as limestone and roll scale, e.g. as above to −65 mesh, may actually tend to produce very small particles, even up to 80% or more finer than 325 mesh.

Provision of required fine-sized materials is thus not difficult, and indeed in any specific case, relatively simple test of the process (if necessary) will reveal whether size characteristics are suitable—for instance if a given agglomerate mix yields full mineralization of the lime (e.g. not more than about 2% free lime in the product) after heat treatment at desired temperature and for a desired time, say 1800° F and not more than 2 hours, preferably 1 hour. In the context of the above, references herein to the materials of the process in suitable finely divided form will be understood as readily determinable in any given instance.

The iron oxide waste ingredients used may vary in Fe content from as much as 70% for roll scale to 45% or less (say, 48% for BF sludge, which may contain some moisture). Such Fe content (with small amounts of metallic Fe in some cases) can be largest $Fe_2O_3$ (as in OH dust), or mixtures of $Fe_2O_3$ and $Fe_3O_4$, or may sometimes be largely the latter, e.g. in roll scale or BF dust. Of course, even where all the material used might be mostly $Fe_3O_4$, it is considered important to provide specific reducing conditions in the mineralization step, for positive assurance of rapid reaction with the lime. According to present discovery, such reaction (not heretofore believed attainable at the low temperatures here used, e.g. 2100° F or less and preferably 1650° to 1900° F, all being far below a sintering temperature) requires the conditions of fine particle size of the materials, with lime and iron oxide ingredients intermixed, and of a reducing environment tending to ferrous state of the iron. To the extent that small percentages of lime (in BOF and BF dust) and of carbon (in BF wastes) are present, these can be suitably taken into account in formulating the mixture.

The products of the process, as pieces, pellets or other bodies, for example larger than $\frac{1}{8}$ inch, preferably greater than $\frac{1}{4}$ inch (e.g. in mean diameter of each), are highly weatherable, strongly coherent against mechanical disintegration, and thus fully suitable for storage, handling and use as material for charge to a blast furnace or the like, providing lime in effect in calcined state (CaO) together with recovered iron values (chiefly as oxide) of full utility for making iron and steel. The non-fused, non-sintered, moderately hard agglomerate bodies from the preferred examples above, made with 50% limestone and 50% waste iron oxides, can be of substantially homogeneous composition, consisting very largely of dicalcium ferrite, which forms a coherent structure throughout the body. Thus such final agglomerate may contain, say, about 34% CaO (in the form of dicalcium ferrite) and upwards of about 37% Fe, largely also in the dicalcium ferrite, with no more than about 2% free lime. Considering the product as possibly consisting entirely of dicalcium ferrite, the content would be about 42% CaO and 41% Fe. Practical examples of the product can thus have a content, say, of about 15% to about 40% CaO (preferably at least 25%) plus at least about as much Fe; the CaO is nearly all combined as dicalcium ferrite, and any excess Fe is primarily in the form of iron oxide, with other substances (from the original materials) usually a few percent and generally not more than about 10%.

We claim:

1. Lime-iron oxide agglomerate consisting of weatherable, hard, non-fused and non-sintered bodies each having a mean diameter of at least about $\frac{1}{8}$ inch, each being a strongly coherent body consisting essentially of iron values and lime, said lime being substantially all present in the form of dicalcium ferrite constituting a coherent structure throughout the body and produced by heating coherent intermixed fine particles of lime and iron oxide at a temperature of about 1650° F to about 2000° F in reducing environment, said bodies being thereby produced, to comprise said dicalcium ferrite, by heating only at temperatures substantially below sintering temperature, said lime being about 15 to 40% of the bodies and said iron values being present at least in sufficient amount to constitute the iron content of said dicalcium ferrite.

2. A method of producing a lime-containing iron oxide agglomerate product comprising establishing a coherent mixture of finely divided lime and finely divided iron oxide, said iron oxide being present at least in sufficient amount so as to provide a sufficient quantity of iron values thereof which can react, in ferrous state, with substantially all of the lime, and heating said coherent mixture, while maintaining the mixture in a reducing environment for establishing said sufficient quantity of iron values in ferrous state, at a sufficient temperature in the range of about 1650° to 2100° F and for a sufficient time, to cause said iron values, while in ferrous state, to react with substantially all of the lime to produce dicalcium ferrite throughout the product.

3. A method as defined in claim 2 in which establishing the mixture includes mixing the finely divided iron oxide with finely divided limestone, and preliminarily heating said iron oxide-limestone mixture to convert the limestone to lime; the heating of the mixture, in the first-mentioned heating step, to cause said reaction of iron values with lime being effected at a temperature not higher than about 2000° F.

4. A method as defined in claim 3 in which said preliminary heating is constituted as a first part of said first-mentioned heating step.

5. A method as defined in claim 4 in which the step of preparing the coherent mixture comprises pelletizing a mixture of the finely divided iron oxide and finely divided limestone by balling treatment.

6. A method as defined in claim 3 in which the steps of mixing the iron oxide and limestone and preliminary heating are followed by subjecting the mixture to hot compacting, said hot compacting being effected while the mixture remains hot from said preliminary heating.

7. A method as defined in claim 6 in which said hot compacting comprises rolling the hot mixture into a continuing compacted strip, and breaking the compacted strip into discrete compacted bodies prior to said first-mentioned heating thereof in a reducing environment.

8. A method as defined in claim 6 in which said hot compacting comprises compressing the hot mixture into discrete briquettes, for supply to the first-mentioned heating step.

9. A method as defined in claim 3 in which the finely divided limestone is in a proportion of about 20% to about 50% of the mixture with the finely divided iron oxide.

10. A method as defined in claim 9 in which the proportion of said limestone is about 50%, and all of the aforesaid heating operations are effected at temperatures not higher than about 1900° F.

11. A method of producing a lime-containing iron oxide, strong agglomerate body comprising establishing a coherent body which is composed of a mixture of finely divided lime and finely divided iron oxide, said iron oxide being present in at least sufficient amount so that substantially all of the lime can react with iron oxide to produce dicalcium ferrite, and heating said coherent body, in a reducing environment, at a sufficient temperature in the range of about 1650° to 2000° F and for a sufficient time to cause substantially all of the lime to react with iron oxide to produce dicalcium ferrite constituted in and throughout said coherent body.

12. A method as defined in claim 11 wherein the step of establishing the coherent body comprises first establishing a mixture of finely divided limestone and finely divided iron oxide, preliminarily heating said limestone-iron oxide mixture to convert the limestone to lime, and then compacting the mixture from said preliminary heating to form the aforesaid coherent body.

13. A method as defined in claim 12 in which the limestone is in a proportion of about 20 to about 50% of the mixture thereof with the iron oxide, and in which the finely divided limestone and the finely divided iron oxide each consists substantially entirely of particles smaller than 65 mesh.

14. A method as defined in claim 11 wherein the step of establishing the coherent body comprises first establishing and cohering into a body, a mixture of finely divided limestone and finely divided iron oxide, and then heating said limestone-iron oxide body, preliminarily to the aforesaid heating for lime-iron oxide reaction, to convert the limestone to lime.

15. A method as defined in claim 14 in which the limestone is in a proportion of about 20 to about 50% of the mixture thereof with the iron oxide, and in which the finely divided limestone and the finely divided iron oxide each consists substantially entirely of particles smaller than 65 mesh.

16. A method as defined in claim 11 in which: the finely divided lime constitutes about 30 to 40% of the coherent body and is predominantly finer than 65 mesh; the finely divided iron oxide constitutes substantially the balance of the coherent body and is predominantly finer than 65 mesh; and said heating to cause the lime to react with the iron oxide is effected at a temperature not higher than about 1900° F.

17. A method as defined in claim 16 in which the step of establishing the coherent body comprises first establishing a mixture of finely divided limestone predominantly finer than 65 mesh and the said finely divided iron oxide, said limestone being thereafter converted to lime by preliminary heating.

18. A method as defined in claim 17 in which the iron oxide consists essentially of waste iron oxide material or materials from iron and steel making operations, and comprises such material or materials selected from the class consisting of: mill scale from steel hot rolling operation; waste iron oxides from blast furnace operation; and waste iron oxides from steel-making furnace operation.

19. Lime-iron oxide agglomerate produced according to claim 2 and consisting of weatherable, hard, non-fused and non-sintered bodies having a size greater than about 150 inch, each being strongly coherent body consisting essentially of iron values and lime, said lime being substantially all present in the form of dicalcium ferrite distributed throughout each body, the lime content of the bodies being at least about 15%, and said iron values being present at least in sufficient amount to constitute the iron content of said dicalcium ferrite.

20. Agglomerate as defined in claim 19, in which the lime content of the bodies is at least about 30%.

* * * * *

UNITED STATES PATENT AND TRADEMARK OFFICE
CERTIFICATE OF CORRECTION

PATENT NO. : 4,063,930

DATED : December 20, 1977

INVENTOR(S) : ROBERT ERNEST KUSNER and ROBERT WILLIAM MUTHIG

It is certified that error appears in the above-identified patent and that said Letters Patent are hereby corrected as shown below:

Abstract, line 7, "yeilding" should read -- yielding --.

Column 4, line 17, "advnata" (word portion of advantageously) should read -- advanta --.

Column 5, line 50, "20" should read -- 19 --.

Column 7, line 44, "of" should read -- to --.

Column 8, line 20, "other examples" should read -- previous example --.

Column 8, line 35, "future" should read -- further --.

Column 8, line 39, "likestone" should read -- limestone --.

Column 8, line 55, "++6" should read -- +6 --.

Column 8, line 62, "be" should read -- by --.

Column 9, line 5, "dicaacium" should read -- dicalcium --.

Column 10, line 11, "discharge" should read -- discharges --.

Column 11, line 4, "traveled " should read -- traversed --.

Column 11, line 18, "BP" should read -- BF --.

Column 11, line 19, "BP" should read -- BF --.

Column 11, line 21, "BOP" should read -- BOF --.

Column 11, line 22, "the" (1st occurrence) should read --be--.

UNITED STATES PATENT AND TRADEMARK OFFICE
CERTIFICATE OF CORRECTION

PATENT NO. : 4,063,930

DATED : December 20, 1977

INVENTOR(S) : ROBERT ERNEST KUSNER and ROBERT WILLIAM MUTHIG

It is certified that error appears in the above-identified patent and that said Letters Patent are hereby corrected as shown below:

Column 11, line 25, "actially" should read -- actually --.

Column 11, line 36, "ances" (word portion of references) should read -- ences --.

Column 11, line 43, "largest" should read -- largely --.

Column 14, line 39 (Claim 19), "150" should read -- 1/8 --.

Signed and Sealed this

Sixteenth Day of May 1978

[SEAL]

Attest:

RUTH C. MASON
Attesting Officer

LUTRELLE F. PARKER
Acting Commissioner of Patents and Trademarks